(12) United States Patent
Scholer

(10) Patent No.: US 7,435,359 B2
(45) Date of Patent: Oct. 14, 2008

(54) CORROSION INHIBITING HEAT TRANSFER MATERIALS

(75) Inventor: Fred R. Scholer, East Windsor, NJ (US)

(73) Assignee: Hercules Chemical Company Incorporated, Passaic, NJ (US)

( * ) Notice: Subject to any disclaimer, the term of this patent is extended or adjusted under 35 U.S.C. 154(b) by 0 days.

(21) Appl. No.: 11/019,869

(22) Filed: Dec. 21, 2004

(65) Prior Publication Data

US 2006/0131544 A1  Jun. 22, 2006

(51) Int. Cl.
*C23F 11/167* (2006.01)
*C23F 11/18* (2006.01)

(52) U.S. Cl. ............... 252/389.23; 252/74; 252/75; 252/76

(58) Field of Classification Search ............. 252/74, 252/75, 76, 389.23
See application file for complete search history.

(56) References Cited

U.S. PATENT DOCUMENTS

| | | | |
|---|---|---|---|
| 4,320,023 A | 3/1982 | White | |
| 4,343,660 A | 8/1982 | Martin | |
| 4,382,870 A | 5/1983 | Abel et al. | |
| 4,389,371 A * | 6/1983 | Wilson et al. | 422/15 |
| 4,426,309 A | 1/1984 | Abel et al. | |
| 4,452,758 A | 6/1984 | Wilson et al. | |
| 4,465,516 A * | 8/1984 | Danner et al. | 106/14.12 |
| 4,548,787 A | 10/1985 | Wilson et al. | |
| 4,557,896 A * | 12/1985 | Brocklebank et al. | 422/14 |
| 4,588,513 A | 5/1986 | Triebel et al. | |
| 4,613,445 A * | 9/1986 | Haack et al. | 252/75 |
| 4,647,392 A | 3/1987 | Darden et al. | |
| 4,728,452 A * | 3/1988 | Hansen | 252/75 |
| 4,759,864 A | 7/1988 | Van Neste et al. | |
| 4,851,145 A | 7/1989 | Van Neste et al. | |
| 4,873,011 A | 10/1989 | Jung et al. | |
| 4,946,616 A | 8/1990 | Falla et al. | |
| 5,073,283 A * | 12/1991 | Leung et al. | 252/78.5 |
| 5,085,791 A | 2/1992 | Burns | |
| 5,085,793 A | 2/1992 | Burns et al. | |
| 5,242,621 A | 9/1993 | Miller et al. | |
| 5,269,956 A * | 12/1993 | Miller et al. | 252/67 |
| 5,290,468 A | 3/1994 | Turcotte et al. | |
| 5,320,771 A * | 6/1994 | Turcotte et al. | 252/76 |
| 5,330,670 A | 7/1994 | Turcotte et al. | |
| 5,589,106 A * | 12/1996 | Shim et al. | 252/387 |
| 5,766,506 A | 6/1998 | Mendoza et al. | |
| 6,143,243 A | 11/2000 | Gershun et al. | |
| 6,203,719 B1 | 3/2001 | Turcotte et al. | |
| 6,228,283 B1 | 5/2001 | Turcotte et al. | |
| 6,290,870 B1 | 9/2001 | Turcotte et al. | |
| 6,391,257 B1 | 5/2002 | Woyciesjes | |
| 6,398,984 B1 | 6/2002 | Maes et al. | |
| 6,733,687 B1 * | 5/2004 | Hudgens | 252/73 |
| 6,953,534 B1 * | 10/2005 | Hudgens | 252/73 |

OTHER PUBLICATIONS

Edward R. Eaton, W.H. Boon, Chris J. Smith, "A Chemical Base for Engine Coolant/Antifreeze with Improved Thermal Stability Properties", 2001, Sae, Inc.
International Search Report dated Jul. 14, 2006 in International Application No. PCT/US2005/43239.

* cited by examiner

*Primary Examiner*—Joseph D Anthony
(74) *Attorney, Agent, or Firm*—Stroock & Stroock & Lavan LLP

(57) ABSTRACT

An anti-corrosion composition for use with a liquid or the liquid resulting from the addition of components is provided. The composition can include an acid, a phosphate ester of an alcohol, an inorganic phosphate, a salt of polyacrylates and a salt of an organophosphonate. The composition can be used with anti-freeze compositions or heat transfer fluids and advantageously exhibits enhanced corrosion resistance properties. A heat transfer medium is also provide, having water, glycol, an ester of a phosphoric acid, a phosphate salt and an acid, wherein the medium is a GRAS composition capable of satisfying ASTM 1384 and 4340.

42 Claims, No Drawings

CORROSION INHIBITING HEAT TRANSFER MATERIALS

BACKGROUND OF THE INVENTION

The invention relates generally to antifreeze compositions and more particularly to corrosion inhibitor packages for antifreeze compositions. Antifreeze compositions containing these packages are particularly suitable for use in closed systems, such as closed loop heat exchange system, more particularly, hydronic heating and cooling closed loop systems containing aluminum.

Hot water boiler systems often use a heat transfer medium such as a fluid comprising water or a water-glycol mixture, such as a water-alkyleneglycol mixture, and an antifreeze or anti-corrosion package. As used herein, "package" will refer to a combination of additives. The medium is used to transfer heat between the source of the heat, e.g. a cast metal heat exchanger and the system, e.g. base board heaters or radiators, designed to deliver heat throughout an area, such as a house. Although the heat transfer fluid provides a means to transfer heat, the fluid can cause corrosion on the surface of the metals in the boiler, transfer conduits and the metal heat exchanger.

Historically, cast iron heat exchangers have been the choice of the heating industry. However, because cast iron heat exchangers are substantially heavier and are less efficient than aluminum at exchanging heat, boilers and other heating and cooling systems containing aluminum fluid conduits are gaining popularity and usage. Aluminum heat exchangers and the like, however, can exhibit undesirable corrosion problems under certain adverse conditions.

Water or water-glycol mixture heat transfer fluids commonly cause corrosion, especially in metal systems, which are particularly susceptible to corrosion. Corrosion can be accelerated by high temperatures and pressures, which are common in an operating boiler system, as well as by minerals or other corrosive species found in water used in boilers.

The industry has long used anti-corrosion packages to provide added protection to the metal surfaces. A preferred corrosion inhibitor for propylene glycol based fluids has been dipotassium phosphate at levels ranging from 0.5% to 5% by weight, often referred to as Inorganic Additive Technology (IAT), such as that available from Hercules Chemical Company, Passic, N.J., Third Coast Chemicals, Pearland, Tex. or Dow Chemical Co., Dow Frost HD MSDS. With this combination of corrosion inhibitor and an alkylene glycol/water mixture, sufficient corrosion protection can commonly be provided to pass the ASTM D-1384 test method. The alkylene glycol/water mixture can include, but is not limited to, ethylene, propylene or dipropylene glycols. Alternate IAT types other than dipotassium phosphate include but are not limited to borates, nitrates, molybdates, nitrites, and silicates, which are consumed as they perform their function, such as balancing the pH. Inorganic additives can also combine with impurities in the formulation or on the surface of the metal and thus be transformed or consumed. These alternate IAT types identified are not used often in heat transfer fluids for boilers because of their toxicity or other chemical stability shortcomings.

The standard ASTM D-1384 corrosion test is a screening test, which measures the corrosion protection provided by alkylene glycol solutions, such as propylene glycol, on standard metals under specific conditions. The corrosion test results are expressed in weight loss in milligrams, representative of mils of penetration per year. The conditions under which the tests are conducted include glycol solutions held at 190° F. (88° C.) for two weeks in suitable glassware, where the glycol level is set at 30% glycol by volume. Metal coupons tested include copper, solder, brass, mild steel, cast iron and aluminum. The limits for weight loss under the test methods described for D-1384 are cited in ASTM D-3306, where the ASTM Limit for each metal is copper (10 mgms), solder (30 mgms), brass (10 mgms), steel (10 mgms), cast iron (10 mgms) and aluminum (30 mgms). The copper coupon conforms to UNS C11000 (SAE CA110), solder conforms to Alloy Grade 30A (SAE 3A), steel conforms to UNS G10200 (SAE 1020) with the chemical composition of the carbon steel is as follows: carbon, 0.17 to 0.23%; manganese, 0.30 to 0.60%; phosphorus, 0.040% maximum; sulfur, 0.05% maximum; cast iron conforms to Alloy UNS F 10007 (SAE G3500) and cast aluminum conforms to Alloy UNS A23190 (SAE 329). In this test method, specimens of metals are totally immersed in aerated coolant solutions prepared with corrosive salts for 336 hours at 190° F. (88° C.). Each test is run in triplicate and the average weight change determined for each metal.

Cast metal heat exchangers used in boilers have traditionally been made of cast iron. Corrosion inhibitor packages based on dipotassium phosphate have long been used in cast iron heat exchangers. However, with the emergence of cast aluminum heat exchangers there is a need to develop a new corrosion inhibitor package for a variety of reasons. First, suppliers of propylene glycol antifreeze post an aluminum disclaimer on their products. Although based on the ASTM D-1384 method, aluminum loss is within the limits set by D-3306, antifreeze suppliers continue to utilize a disclaimer with respect to aluminum surfaces. This has caused concerns as to their effectiveness for use with aluminum. Second, when tested with other methods, such as ASTM D-6208, which measures repassivation, i.e. resistanse to chemical pitting of aluminum surfaces by galvanostatic measurement, a test favored by manufacturers of aluminum combustion engines, the propylene glycol-DKP solutions do not meet the passing value of - 400 mV. Third, when tested against D-4340, which measures weight loss under specific use conditions of heat and motion of the fluid, propylene glycol-DKP solutions also fail the standard. Fourth, the extensive use of complex inhibitor packages used in aluminum automobile engines is not suitable for use in hot water boilers.

ASTM D-6208 is a test method designed to measure the relative effectiveness of corrosion inhibitors to mitigate pitting corrosion of aluminum and its alloys. The minimum potential number derived is a measure of the protection against continued pitting corrosion. The test is aggressive in that the standard solution contains chloride, sulfate and bicarbonate. ASTM D-4340 evaluates the effectiveness of heat transfer fluids in combating corrosion under conditions that may exist in aluminum engines.

Various attempts to address these and other drawbacks of conventional antifreeze solutions are disclosed in U.S. Pat. Nos. 6,398,984, 6,391,257, 6,290,870, 6,143,243, 5,766,506, 5,330,670, 5,290,468, 5,269,956, 5,242,621, 5,085,793, 5,085,791, 4,946,616, 4,873,011, 4,851,145, 4,873,011, 4, 647,392, 4,588,513, 4,452,758, 4,426,309, 4,382,870 and 4,320,023, which are all incorporated in their entirety herein by reference.

Aluminum surfaces are susceptible to several types of corrosion mechanisms, including general corrosion, pitting, crevice and cavitation corrosion, as discussed in U.S. Pat. No. 6,398,984, which has been incorporated herein by reference. Complex mixtures of triazoles, thiazoles, borates, silicates, phosphates, benzoates, nitrates, nitrites and molybdates have been used as corrosion inhibitors in antifreeze solutions for automobile engines. More detail regarding mixtures for internal combustion engines is available in U.S. Pat. Nos. 4,873,011 and 4,946,616, which are incorporated in their entirety herein by reference. These complex mixtures, however, are not suitable for protecting the heat exchangers used in boilers from corrosion. For example, they can materially alter the surface characteristics of the metal involved in the heat exchanger. This can significantly reduce the efficiency of heat transfer. Some of the components also have a tendency to form gels or thick layers on the metal surfaces. Also, these mixtures can be expensive to use in formulations for the average home boiler and do not provide protection over a sufficiently long period of years. Additionally, because of the risk of contamination of the water from the heater side to the circulating hot water side of the boiler, the toxicity of the heat transfer fluid plays a role in determining which additives may be used.

The emergence of the aluminum automobile engine has prompted the development of new corrosion additives for cast aluminum engines, as discussed in U.S. Pat. No. 6,391,257, which is incorporated it its entirety herein by reference. The automotive industry has developed engine coolants based on mono and dicarboxylic acid technology used in conjunction with other traditional additives, as illustrated in U.S. Pat. No. 4,647,392, which is incorporated herein by reference in its entirety. This is referred to as Organic Acid Technology (OAT), which includes carboxylate salt technologies, which are not consumed as a part of their use, thereby extending the life of the antifreeze. Carboxylates protect metal surfaces by application of a thin coating, and are often used in combination with IAT's, but have restricted use because some OAT's react with IAT's. Although carboxylic acids have been successfully used either among themselves or in combination with other additives, when formulated with propylene glycol, they are not known to pass either the ASTM D-1384 or D-6208.

In light of shortcomings of the conventional methods and applications known in the art, it is desirable to provide improved additives for antifreeze compositions.

SUMMARY OF THE INVENTION

Generally speaking, in accordance with the invention, antifreeze compositions and additives for anti-freeze compositions are provided which exhibit enhanced corrosion resistance properties. The invention is also directed to a heat transfer fluid, preferably comprising water or a water-glycol mixture, comprising a corrosion inhibitor package preferably comprising one or more additives, preferably selected from the families of (1) inorganic phosphates (especially dipotassium phosphate); (2) phosphonates and organophosphonates (especially phosphonates from the family of HEDP, where HEDP is 1-hydroxyethylidene-1,1-diphosphonic acid); (3) organophosphates and salts thereof; (4) polycarboxylic acid salts, such as salts of polyacrylic or methacrylic polymers and organic acids, preferably carboxylic acids and salts thereof (especially salts of ethylhexanoic acid); (5) partial organophosphate esters of alcohols, (especially mono or di-ethylhexyl esters of phosphoric acid). Whereas the additive package can comprise salts or acids of the components described above, because it is preferred to adjust the pH of the package to a pH greater than 8 for effectiveness, it is preferred to include the salts, rater than the neutralized acids, of the additive components. The additives preferably comprise mixtures of mono or di-alkyl, aryl, or alkylaryl phosphate esters, and aliphatic acids, more preferably in combination with an inorganic phosphate, sodium salts of polycarboxylic acid, most preferably of polyacrylates or polymethacrylates, and sodium salts of ethylhexyldiphosphonic acid.

Preferably, the aliphatic acids comprise branched acyclic or cyclic aliphatic acids, such as ethylhexanoic acid. The most preferred additives comprise 2-ethylhexanoic acid and monoethylhexylphosphate and salts thereof, in combination with dipotassium phosphate, sodium acrylate polymer and sodium ethylhexylphosphonate adjusted to a preferred pH range of 8.5 to 9.5. This pH range is preferred because aluminum corrosion often increases at very high or low pH's, at least partly resulting from deterioration of the aluminum oxide film, which covers the surface of aluminum metal. Preferred embodiments of the invention exclude meaningful amounts or even not more than a trace of amines, nitrates, nitrites, chromates, molybdates, borates, triazoles and/or silicates.

Accordingly, it is an objective of the invention to provide an antifreeze composition that comprises corrosion inhibiting agents that is useful in water or water alkyleneglycol heat transfer fluids and is applicable to uses where potable water is of serious concern.

It is another objective of the invention to provide an antifreeze composition that can be used in aluminum containing boiler systems.

Still other objects and advantages of the invention will in part be obvious and will in part be apparent from the specification.

The invention accordingly comprises the several steps and the relation of one or more of such steps with respect to each of the others, and the composition embodying combinations of elements which are adapted to affect such steps, all as exemplified in the following detailed disclosure, and the scope of the invention will be indicated in the claims.

DESCRIPTION OF THE PREFERRED EMBODIMENTS

A heat transfer fluid in accordance with the invention can comprise water or water-glycol mixtures. Examples of these include, but are not limited to, water-alkyleneglycol mixtures. These fluids should include corrosion inhibitor packages. For example, the packages preferably include any or all of a combination of inorganic phosphates, partial esters of phosphoric acid, organophosphonates, polycarboxylic acid salts and salts of organic acids neutralized to a pH greater than 7. The corrosion inhibitor packages can also include organophosphate esters of organic acids, preferably of aliphatic acids.

Corrosion inhibitor packages in accordance with the invention can be formulated to extend the life of a cast aluminum or iron heat exchanger by providing protection to the surface of the metal. Preferred embodiments of the invention can also moderate the pH of the solution. One possible way in which the pH of the solution is moderated is by the presence of the salts of various acids to provide a buffering counter-ion. When the antifreeze solution degrades over time and produces acid by-products, the salts of the various acids present in the package can react with the acid by-products to neutralize them. For example, if dipotassium phosphate is present in the package, it can neutralize the acid by-product to produce monopotassium phosphates. Sodium salts were determined to have particularly suitable solubilities in water/glycol mixtures. Certain salts, such as calcium and magnesium salts, can result in hardening of the water, and therefore is not preferred.

Preferred embodiments of the invention can suspend and sequestrate minerals contained in a heat exchanger. Preferred embodiments of the invention provide a corrosion inhibitor package that provides protection as defined in any and preferably all of ASTM D-1384, ASTM D-4340 and ASTM D-6208. They can also be suitable for use in home heating systems, provide long term (2 or more years) stability, avoid costly alloy ingredients and help various environmental concerns.

Alkylene glycols in the water-glycol mixture can include, but are not restricted to, 1,2 or 1,3-propylene glycol and ethylene glycol, which are commercially available. Propylene glycol is the preferred antifreeze of choice because of the negative health concerns of using ethylene glycol. The propylene glycol family is preferred among organic glycols because they have a very low toxicity and are GRAS (Generally Recognized As Safe) chemicals. Although there is no transfer of the antifreeze between the heat exchanger and the hot water used by the public in the traditional hot water heating system, a leak in the system may cause a transfer and from time-to-time, the system will need to be purged and/or flushed. Accordingly, propylene glycol is preferred.

Aqueous solutions of propylene glycol have excellent heat transfer and antifreeze properties. This makes them valuable as low-temperature heat transfer fluids. Propylene glycol, when manufactured under Good Manufacturing Practice per US-FDA guidelines, is cleared for various uses under the Food Additive Regulations (Title 21, 178.3300 Code of Federal Regulations, corrosion inhibitors used for metals), *A Guide to Glycols, the Dow Chemical Company*. Propylene glycol is also listed in the Food Chemicals Codex and is generally recognized as safe (GRAS) under 21 CFR 184.6666.

The freezing point of an aqueous solution of propylene glycol is substantially lower than the freezing point of water, and accordingly, the freezing point of the water-propyleneglycol mixture is lower than the freezing point of water. The addition of propylene glycol also dramatically improves the burst point, i.e. the temperature at which the expansion of the fluid will cause a pipe to burst.

Furthermore, the solutions do not have a clear freezing point, but rather become slushy. At a very low temperature the slush becomes more and more viscous and eventually ceases to flow. In a mixture of propylene glycol and water, the freeze protection is rated at 12° F. when the level of glycol is about 30% by weight, −6° F. at 40% level of glycol, and −28° F. at 50% level of glycol. Glycol fluids have the ability to provide burst protection because of their very low freezing point. As glycol fluid solutions cool, ice crystals can form, while the remaining fluid becomes more concentrated in glycol. The fluid volume increases as this slush forms. If insufficient amount or no glycol is present, the water can freeze and expand, thereby causing the pipes to crack.

Alternative alkylene glycols and their ethers can be used, such as ethylene glycol, 1,3-propylene glycol or polyalkylene glycols, such as dipropylene glycol. 1,2-propylene glycol, however, is preferred because of its low toxicity and commercial availability. Glycol ethers may also be used, but are not as preferred because of high cost and lower stability.

The heat transfer fluids do not need to contain anti-freeze components. In certain warm regions of the country, it is common for 100% water to be used as a heat transfer fluid. The invention can work substantially as well in water systems in inhibiting corrosion without the inclusion of anti-freeze components.

Cast aluminum heat exchangers commonly require a specific combination of corrosion inhibitors in order to pass a variety of corrosion tests commonly employed in the field of corrosion testing for aluminum, which includes ASTM D-1384, ASTM D-6208 and ASTM D-4340. D1384 describes a chemical corrosion test conducted in glassware measuring the corrosive effect of heat transfer fluids on metal specimens. ASTM D-6208 determines the susceptibility of aluminum alloy to pitting corrosion. ASTM D-4340 evaluates the effectiveness of heat transfer fluids in combating corrosion under conditions that may exist in aluminum engines. Each test focuses on a different aspect of corrosion. As the data will indicate below, reliance on just one of the three tests will not disclose the full range of performance of selected corrosion inhibitor packages. This non-specificity can then lead to unforeseen failures. Accordingly, it is desirable to perform a variety of tests on the corrosion inhibitor in order to obtain a more complete evaluation. It is particularly desirable to perform the tests described above, which collectively provide the assertion that a heat transfer fluid containing a corrosion inhibitor package can sufficiently protect the aluminum heat exchanger surfaces. Preferred packages in accordance with the invention pass 1384 and either 4340 or 6208, and the most preferred packages in accordance with the invention perform well during each of these three ASTM tests.

Corrosion inhibitor package of the invention preferably excludes certain conventional additives. For example, some of the excluded conventional additives include molybdates, silicates, borates, thiazoles, nitrates and nitrites.

The corrosion inhibitor package of the invention also comprises additives that are not typically used in heat transfer fluids. The additives of the corrosion inhibitor package of the invention preferably comprise a combination of organic acids, preferably aliphatic acids and preferably also their salts, which are preferably combined with inorganic phosphates, preferably dipotassium phosphate, salts, preferably sodium salts, of polycarboxylic acids, preferably polyacrylates, and/or salts, preferably sodium salts, of an organophosphate, preferably ethylhexyldiphosphonic acid. In a preferred embodiment, the additives also include phosphate esters of the organic acids.

Whereas each of these components typically individually fail one or more of the ASTM tests cited above, a suitable combination comprising effectively selected amounts of each component can obtain a positive result for each of the tests. It is likely that the exclusion of any one component could result in the failure of one or more of the ASTM tests as well, thereby resulting in a loss in confidence regarding corrosion resistance.

The organic acids of the corrosion inhibitor preferably include aliphatic acids, preferably mono or dicarboxylic acids, more preferably branched acyclic or cyclic aliphatic acids. More preferred aliphatic acids and their phosphate esters include derivatives or examples based on ethylhexanoic acid. Most preferred are 2-ethylhexanoic acid and mono-ethylhexylphosphate. Whereas other organic acids, such as branched acyclic or cyclic aliphatic acids may be used, the ethylhexanoic acid and its derivatives are preferred because of their performance and commercial perspective.

Preferred inorganic phosphates include dipotassium phosphate, and preferred polycarboxylic acid salts include neutralized salts of polyacrylic acid, most preferably sodium salts of acrylate and methacrylate polymers. Preferred organophosphonates include salts of HEDP.

Most preferably, a corrosion inhibitor package includes 2-ethylhexanoic acid and mono-ethylhexylphosphate in combination with dipotassium phosphate, sodium acrylate polymer and sodium ethylhexyldiphosphonate. It is advantageous to adjust the pH to a range of 8.5 to 9.5.

In one embodiment of the invention, the additives comprise about 0.5-5% dipotassium phosphate, about 0.5-5% ethylhexanoic acid, about 0.5-5% ethylhexylphosphate, about 0.1-

1% sodium polyacrylate polymer and about 0.1-1% of the sodium ethylhexyldiphosphonate. The percent water in the heat transfer fluid can range from 0 to 100%, wherein the balance comprises propylene glycol.

Some corrosion inhibitors used with aluminum engines in cars include organic additives in conjunction with ethylene glycol, but these formulations require the use of triazole, nitrite or molybdate additives to complement the organic acid package. These three required additives are expressly excluded from certain preferred embodiments of the invention. Among the additives expressly excluded, other than ineffectively small or even no more than trace amounts, include amines, nitrates, nitrites, chromates, molybdates, borates, triazoles and silicates.

Furthermore, the corrosion package for aluminum car engines expressly forbids the use of phosphates or phosphonates. Preferred embodiments of the invention, in contrast, comprises a combination of phosphorus-based additives and organic salts adjusted to a specific pH, which can control corrosion as well as ancillary problems, such as water hardness, mineral deposits and biofouling. The invention also possesses a specific advantage that traditional corrosion packages for propylene glycol boiler systems based on dipotassium phosphate do not have: the components in this invention can have a substantially longer extended lifetime and are typically not depleted as quickly as dipotassium phosphate alone.

The following tables illustrate the different ASTM test results obtained by the different examples of heat transfer fluids in accordance with the invention that were tested. The different tests are discussed above. It is to be understood that whereas the examples and data focus on specific combinations, such combination are only examples and should not be construed as limiting the present invention in any way.

For the following tests, the examples comprise the following combinations, wherein the pH was adjusted by adding sodium hydroxide, Examples 3 and 4 represent preferred embodiments of the invention:

Example 1: 30% 1,2 Propyleneglycol containing 2% dipotassium phosphate, pH adjusted to 9.0.

Example 2: 30% 1,2 Propyleneglycol containing 1.7% dipotassium phosphate, sodium HEPD and sodium polyacrylate, pH adjusted to 9.0.

Example 3: 30% 1,2 propyleneglycol containing 1.7% dipotassium phosphate, sodium HEDP, sodium polyacrylate and 2-ethylhiexanoic acid, pH adjusted to 9.0.

Example 4: 30%1,2 propylene glycol containing 1.7% dipotassium phosphate, sodium HEDP, sodium polyacrylate, 2-ethylhexmnoic acid and mono-2ethylhexylphosphate, pH adjusted to 9.0.

Example 5: 30% 1,2-propylene glycol containing 1.7% dipotassium phosphate, sodium HEDP, sodium polyacrylate and mono-2 ethylhexylphosphate, pH adjusted to 9.0.

Comparison Example 6: Commercially available HTF for aluminum heat exchangers, sold under the trademark INTERCOOL® NFP, manufactured and sold by Interstate Chemical Company of Hermitage, Pa., comprising dipotassium phosphate.

Comparison Example 7: Commercially available HTF for aluminum heat exchangers, sold under the trademark FERNOX, manufactured and sold by Cookson Electronics of England, which utilizes carboxylic acid salts as part of the corrosion additive package.

Comparison Example 8: Commercial Propylene Glycol antifreeze with organic corrosion inhibitors, nitrates and triazoles for use in aluminum boilers but not for use in areas of potable water contact, sold under the trademark No BURST® Aluminum, sold by The Noble Company of Grand Haven, Mich. comprising propylene glycol, less than 1% of ethylhexanoic acid, less than 1% of sodium triazole, and less than 1% of sodium nitrate. This product is not a G.R.A.S. product.

Comparison Example 9: Commercial antifreeze sold under the trademark DEXCOOL®, sold by Shell Lubricants US, which is an antifreeze fluid for aluminum car engines.

Example 10: 30 % Propylene glycol in water with pH adjusted to 9.0.

Example 11: 30 % Propylene glycol containing 2% 2-ethylhexanoic acid with a pH adjusted to 9.0.

Example 12: 30% Propylene glyvol containing sodium HEDP/polyacrylete with a pH adjusted to 9.0.

TABLE 1

ASTM D-1384 Test Data

| ASTM D1384 Test DataMetal | Example 1 | Example 2 | Example 3 | Example 4 | Example 5 | Comparison Example 6 | ASTM Limit* |
| --- | --- | --- | --- | --- | --- | --- | --- |
| Copper | 6 | 6 | 7 | 1 | | 1 | 10 |
| Solder | 8 | 5 | 6 | 2 | | 3 | 30 |
| Brass | 2 | 1 | 1 | 1 | | 2 | 10 |
| Steel | 1 | 0 | 1 | 0 | | 11 | 10 |
| Iron | 8 | 26 | 1 | 2 | | 3 | 10 |
| Aluminum | 22 | 76 | 1 | 5 | | 27 | 30 |

TABLE 1-continued

ASTM D-1384 Test Data

| Metal | Comparison Example 7 | Comparison Example 8 | Comparison Example 9 | ASTM Limit* |
|---|---|---|---|---|
| Copper | 4 | 1 | NA | 10 |
| Solder | 21 | 1 | NA | 30 |
| Brass | 19 | 1 | NA | 10 |
| Steel | 11 | 0 | NA | 10 |
| Iron | 224 | 1 | NA | 10 |
| Aluminum | 71 | 11 | NA | 30 |

*Limits published in ASTM D-3306 Standard Specification for Glycol Base Engine Coolants. Average number exceeding the ASTM Limit is considered a failure.

As can be seen, each of the examples passed ASTM D-3306 except Example 2 for Iron and Aluminum.

TABLE 2

ASTM D-6208
Repassivation of Aluminum Surfaces by Galvanostatic Measurement
Pass/Fail Standard Not less Than −400 mv

| Metal | Example 1 | Example 2 | Example 3 | Example 4 | Example 5 |
|---|---|---|---|---|---|
| Al | −562 Fail | −501 Fail | +184 Pass | +985 Pass | +2291 Pass |

| Metal | Comparison Example 6 | Comparison Example 7 | Comparison Example 8 | Comparison Example 9 |
|---|---|---|---|---|
| Al | −568 Fail | NA | +342 Pass | NA |

| | Example 10 | Example 11 | Example 12 |
|---|---|---|---|
| 30% PG/Water | −740 Fail | −538 Fail | −421 Fail |

As can be seen, Examples 3 and 4 in accordance with the invention passed ASTM D-6208. As for the comparison examples, comparison example 6 failed and 8 passed. The test was not applicable for 7 and 9.

TABLE 3

ASTM D-4340
Corrosion of Heat Rejecting Aluminum
Pass/Fail Standard Not More Than 1 mg/cm$^2$/week
Test run at 190° F. to reflect temperature use conditions

| Metal | Example 1 | Example 2 | Example 3 | Example 4 | Example 5 | Comparison Example 6 | Comparison Example 7 | Comparison Example 8 | Comparison Example 9 |
|---|---|---|---|---|---|---|---|---|---|
| Al | NA | 1.19 Fail | 0.24 Pass | 0.24 Pass | 0.07 Pass | 2.32 Fail | 3.7 Fail | 0.08 Pass | 0.09 Pass |

As can be seen from the above, the compositions of Examples 3 and 4 passed every test. Examples 1, 2, 5 and 10-12 failed ASTM D-6208 and Example 2 failed and Example 1 was not applicable for ASTM D-4340. All the Comparison Examples 6-9, on the other hand, were not satisfactory. Comparison Examples 6, 7 and 9 passed a collective total of two of the three ASTM tests: 6 passed one, and failed two; 7 passed none, failed two, and one test was not applicable; and 9 passed one, and two tests were not applicable. Comparative Example 8, whereas it passed all three ASTM tests, is not a GRAS composition and includes triazole and sodium nitrite, and therefore is not potable, which is an objective certain embodiments of the invention seek to address. Accordingly, it can be seen that certain embodiments of the invention are beneficial over the commercially available compositions.

As is evident from the foregoing, conventional additives used to inhibit corrosion from heat transfer fluids in common heat exchangers usually rely on the use of dipotassium phosphate. Although the use of dipotassium phosphate results in a strong pass for a test based on ASTM D-1384 Glassware Corrosion Test, the data demonstrates that the use of dipotassium phosphate alone will result in a failure of the ASTM D-6208 and/or D-4340. Although some improvement is noted by the inclusion of the sodium polyacrylate and sodium ethylhexylphosphonate, optimum results across the three tests are not obtained without the inclusion of the ethylhexanoic acid and mono-2-ethylhexylphosphate. Similar results would be expected with their respective sodium salts. Notably, a dramatic increase in performance is obtained for the ASTM D-6208 repassivation of aluminum surfaces test, which many in the art deem to be especially important. In all test cases the pH of the test solutions is maintained at 9.0.

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

Particularly it is to be understood that in said claims, ingredients or compounds recited in the singular are intended to include compatible mixtures of such ingredients wherever the sense permits.

The invention claimed is:

1. An anti-corrosion formulation for combining with a fluid or the fluid resulting from the addition of components, comprising:
   an acid;
   a phosphate ester of an alcohol;
   an inorganic phosphate;
   a salt of polyacrylates; and
   a salt of an organophosphonate;
   the formulation being a GRAS composition capable of satisfying ASTM 1384, 6208 and 4340.

2. The formulation of claim 1, wherein the acid is aliphatic and comprises one or more carboxylic acids.

3. The formulation of claim 1, wherein the acid is aliphatic and comprises one or more branched acyclic aliphatic acids.

4. The formulation of claim 1, wherein the acid is aliphatic and comprises one or more branched cyclic aliphatic acids.

5. The formulation of claim 1, wherein the components comprise ethylhexanoic acid.

6. The formulation of claim 1, wherein the components comprise one or more derivatives of ethylhexanoic acid.

7. The formulation of claim 1, wherein the components comprise 2-ethylhexanoic acid.

8. The formulation of claim 1, wherein the phosphate ester of the alcohol comprises mono-ethylhexylphosphate.

9. The formulation of claim 1, wherein the inorganic phosphate comprises dipotassium phosphate.

10. The formulation of claim 1, wherein the salt of polyacrylates comprises one or more sodium acrylate polymers.

11. The formulation of claim 1, wherein the organophosphonate comprises ethylhexyldiphosphonic acid.

12. The formulation of claim 1, wherein the salt of an organophosphonate comprises sodium ethylhexyldiphosphonate.

13. The formulation of claim 1, wherein the formulation has a pH of about 8 to 10.

14. The formulation of claim 11, wherein the formulation has a pH of about 6.5 to 10.5.

15. The formulation of claim 11, wherein the formulation has a pH of about 9.

16. The formulation of claim 1, wherein the inorganic phosphate comprises about 0.5-5% of the formulation by weight.

17. The formulation of claim 16, wherein the inorganic phosphate comprises about 1.5% of the formulation by weight.

18. The formulation of claim 1, wherein the acid is aliphatic and comprises about 0.5-5% of the formulation by weight.

19. The formulation of claim 18, wherein the acid comprises about 1% of the formulation by weight.

20. The formulation of claim 1, wherein the phosphate ester of the alcohol comprises about 0.5-5% of the formulation by weight.

21. The formulation of claim 1, wherein the phosphate ester of the alcohol comprises about 1% of the formulation by weight.

22. The formulation of claim 1, wherein the salt of polyacrylate comprises about 0.01-1% of the formulation by weight.

23. The formulation of claim 22, wherein the salt of polyacrylate comprises about 0.1% of the formulation by weight.

24. The formulation of claim 1, further comprising a sodium ethylhexyldiphosphonate comprising about 0.01-1% of the formulation by weight.

25. The formulation of claim 24, wherein the sodium ethylhexyldiphosphonate comprises about 0.1% of the formulation by weight.

26. The formulation of claim 1, wherein the water comprises over about 95% of the formulation by weight.

27. The formulation of claim 1, further comprising an alkylene glycol.

28. The formulation of claim 1, further comprising a propylene glycol.

29. The formulation of claim 1, further comprising a 1,2 propylene glycol.

30. The formulation of claim 1, further comprising a 1,3 propylene glycol.

31. The formulation of claim 1, further comprising a dipropylene glycol.

32. The formulation of claim 1, further comprising one or more monoalkyl ethers of one of 1,2 propylene glycol, 1,3 propylene glycol and dipropylene glycol.

33. The formulation of claim 27, wherein the alkylene glycol comprises about 0-90% of the formulation by weight.

34. The formulation of claim 1, wherein the formulation is used in a heat exchanger comprising aluminum.

35. The formulation of claim 1, wherein the formulation is used in a heat exchanger comprising aluminum alloy.

36. The formulation of claim 1, wherein the formulation is used in a heat exchanger comprising cast iron.

37. The formulation of claim 1, wherein the formulation does not comprise more than a trace amount of amines, nitrates, nitrites, chromates, molybdates, borates, triazoles and silicates.

38. A heat transfer medium comprising:
   water;
   an alkyleneglycol;
   an aliphatic acid;
   a partial phosphate ester;
   dipotassium phosphate;
   a sodium salt of polyacrylates; and
   a sodium salt of ethylhexyldiphosphonic acid;
   the medium being a GRAS composition capable of satisfying ASTM 1384 and 4340.

39. A heat transfer medium, comprising
   water,
   glycol,
   an ester of a phosphoric acid, and
   a phosphate salt and an acid;
   the medium being a GRAS composition capable of satisfying ASTM 1384 and 4340.

40. The medium of claim 39, wherein the medium comprises 30% 1,2 propyleneglycol by weight, the medium containing
   1.7% dipotassium phosphate by weight,
   sodium HEDP,
   sodium polyacrylate and
   2-ethylhexanoic acid with a pH adjusted to 9.0.

41. The medium of claim 39, wherein the medium comprises 30 % 1,2 propylene glycol by weight, the medium containing
   1.7% dipotassium phosphate by weight,
   sodium HEDP,
   sodium polyacrylate,
   2-ethylhexanoic acid and
   mono-2ethylhexylphosphate with a pH adjusted to 9.0.

42. The formulation of claim 1, wherein the phosphate ester of an alcohol comprises mono-2-ethylhexylphosphate.

* * * * *